United States Patent
Biancalana

(10) Patent No.: US 8,336,824 B2
(45) Date of Patent: Dec. 25, 2012

(54) DEVICE FOR PROTECTING AND GUIDING A CABLE FROM A DIRECT-VISION WINDOW OF AN AIRCRAFT FLIGHT DECK

(75) Inventor: Olivier Biancalana, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 1209 days.

(21) Appl. No.: 12/159,988

(22) PCT Filed: Jan. 8, 2007

(86) PCT No.: PCT/FR2007/050621
§ 371 (c)(1),
(2), (4) Date: Jul. 3, 2008

(87) PCT Pub. No.: WO2007/080344
PCT Pub. Date: Jul. 19, 2007

(65) Prior Publication Data
US 2008/0302202 A1    Dec. 11, 2008

(30) Foreign Application Priority Data
Jan. 10, 2006   (FR) ...................................... 06 50086

(51) Int. Cl.
*B64C 1/14*  (2006.01)
(52) U.S. Cl. .................................. 244/129.3; 244/129.1
(58) Field of Classification Search ............... 244/129.1, 244/129.3, 129.4, 129.5, 129.6, 131; 59/78.1
See application file for complete search history.

(56) References Cited

U.S. PATENT DOCUMENTS

| | | | | |
|---|---|---|---|---|
| 4,157,846 A | * | 6/1979 | Whitcroft | 296/155 |
| 5,064,147 A | * | 11/1991 | Noble et al. | 244/129.5 |
| 5,832,668 A | * | 11/1998 | Faubert et al. | 49/215 |
| 6,189,833 B1 | * | 2/2001 | Ambrose et al. | 244/129.5 |
| 6,996,967 B2 | * | 2/2006 | Kobayashi | 59/78.1 |
| 7,984,874 B2 | * | 7/2011 | Diergardt | 244/131 |

FOREIGN PATENT DOCUMENTS

| | | |
|---|---|---|
| EP | 1 378 400 A1 | 1/2004 |
| JP | 2005-238932 A | 9/2005 |
| WO | 2005/098186 A1 | 10/2005 |

* cited by examiner

*Primary Examiner* — Tien Dinh
*Assistant Examiner* — Richard R Green
(74) *Attorney, Agent, or Firm* — Young & Thompson

(57) ABSTRACT

A device for protecting and guiding at least one cable (22) that connects a direct-vision window (10) of an aircraft cabin that is provided for blocking an opening, and connects its support (14), includes a cable chain (26) that can deform along a winding plane and protect and guide the cable (22), on both sides of the cable chain (26), a first support (28) that is articulated relative to the direct-vision window (10) so as to be able to pivot around an axis of articulation (36) that is essentially parallel to the release translation and a second support (30) that is articulated relative to the support (14) so as to be able to pivot around an axis of articulation (38) that is essentially parallel to the release translation and the first and second supports (28, 30) have a square cross-section.

19 Claims, 4 Drawing Sheets

Figure 3A:
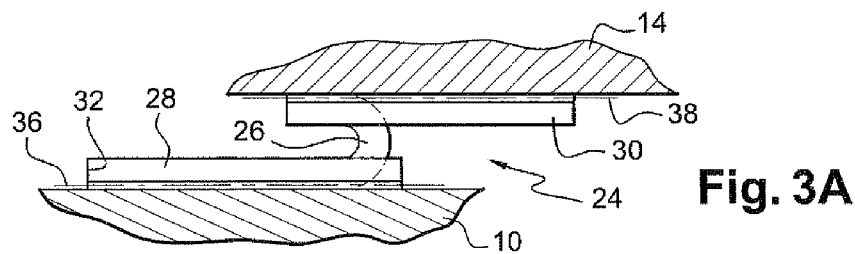

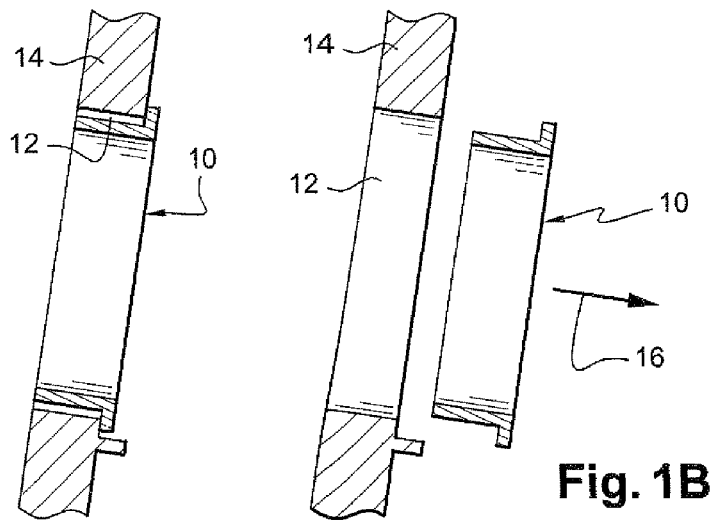
Fig. 1A  Fig. 1B
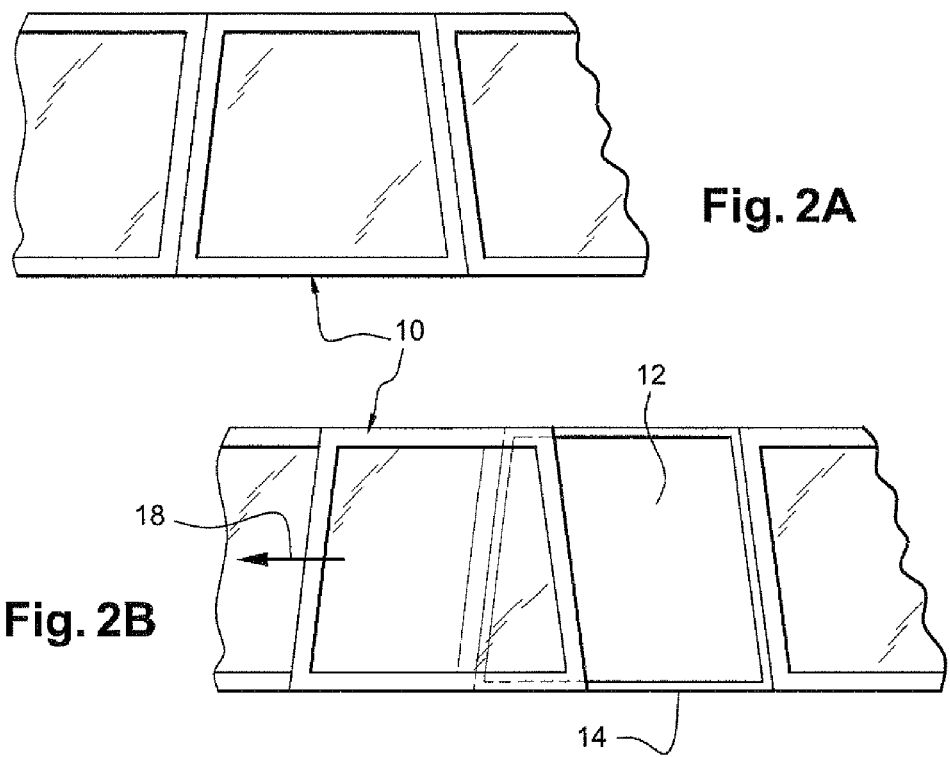
Fig. 2A
Fig. 2B

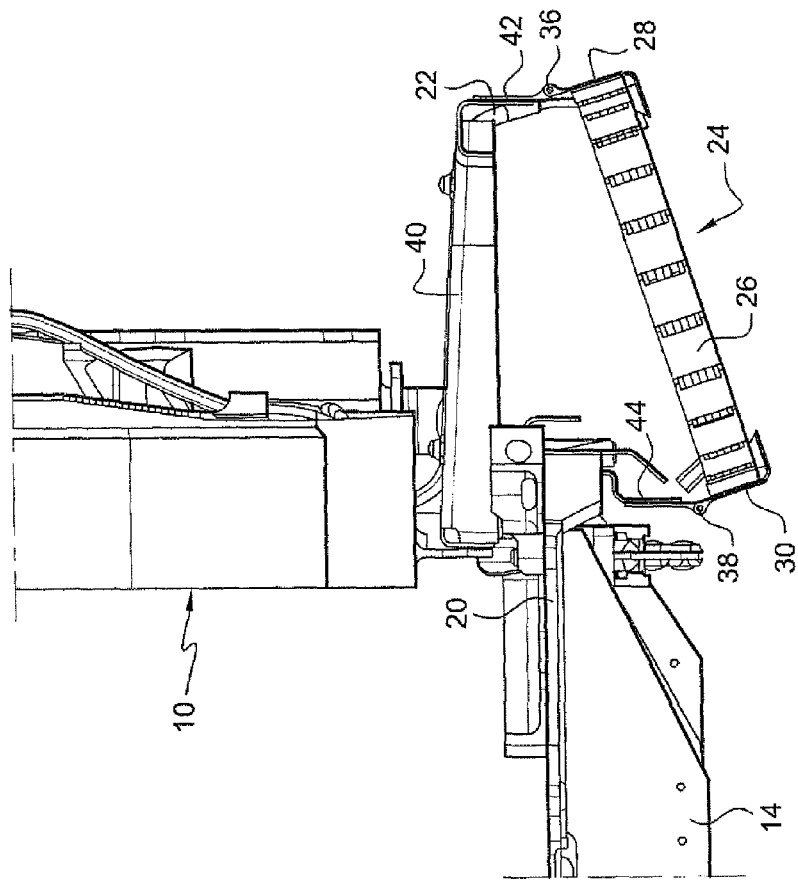
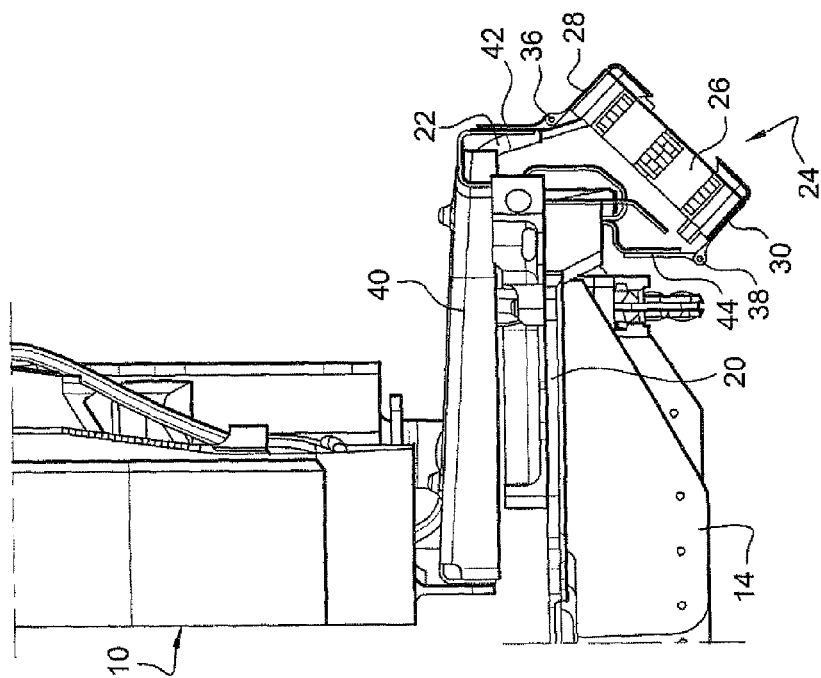

DEVICE FOR PROTECTING AND GUIDING A CABLE FROM A DIRECT-VISION WINDOW OF AN AIRCRAFT FLIGHT DECK

BACKGROUND OF THE INVENTION

1. Field of the Invention

This invention relates to a device for protecting and guiding a cable, such as a power supply cable, from a direct-vision window of an aircraft flight deck.

2. Description of the Related Art

The flight deck comprises a windshield that incorporates a direct-vision window on at least one side. This direct-vision window comprises a glassed-in frame that moves relative to a support that delimits an opening that is made in the windshield. To open the direct-vision window, it is necessary to carry out a first translation toward the inside of the cabin to move said direct-vision window forward from the support, and then a second translation to make the direct-vision window slide in a manner that is essentially parallel to the windshield to release the opening. For this purpose, in the lower part, the opening comprises a table that defines a slip plane on which the direct-vision window can slide during two translations. This slip plane is generally inclined on the order of 20 to 40° C., in particular based on the shapes of the flight deck.

In general, the direct-vision window is connected to the support by means of at least one cable that is provided for the power supply of the defrosting system and a reading light.

To allow the movements of the direct-vision window, the cable comprises a "pigtail"-shaped portion.

This simple solution is not satisfactory because the "pigtail"-shaped cable has a tendency to be extended after only a few cycles. This extended cable creates a problem for the flight crew that can hinder them, and can even create a danger to the extent that the flight instruments may become tangled up therein. Furthermore, the non-mechanical hold of the cable in the form of a "pigtail" can cause risks of clamping at each end of the cable and this clamping is likely to produce the rupture of the internal electric cables. This is reflected by malfunctions of the equipment fed by said cable, in particular the defrosting system.

SUMMARY OF THE INVENTION

The invention aims at remedying the drawbacks of the prior art by proposing a device for guiding and protecting the cable that connects the direct-vision window and its support that makes it possible to limit the risks of malfunctions and problems for the flight crew.

For this purpose, the invention has as its object a device for protecting and guiding at least one cable that connects, on the one hand, a direct-vision window of an aircraft cabin that is provided for blocking an opening, and, on the other hand, its support, whereby said direct-vision window may be translated according to a first translation, toward the inside of the cabin, so as to occupy an offset intermediate position relative to the support, then according to a second release translation so as to release the opening, characterized in that it comprises a cable chain that can deform along a winding plane and protect and guide said cable, on both sides of said cable chain, a first support that is articulated relative to the direct-vision window so as to be able to pivot around an axis of articulation that is essentially parallel to the release translation, and a second support that is articulated relative to the support so as to be able to pivot around an axis of articulation that is essentially parallel to the release translation, and in that the first and second supports have a square cross-section, whereby one side of the square can be used as a support to the cable chain, and the other side is used as a protective element of the cable chain and is articulated at the level of its free edge or relative to the direct-vision window or relative to the support of the direct-vision window.

This arrangement makes it possible to obtain protection of the cable that can become deformed during movements of the direct-vision window while preserving a certain rigidity.

BRIEF DESCRIPTION OF THE DRAWING FIGURES

Figure 3B:
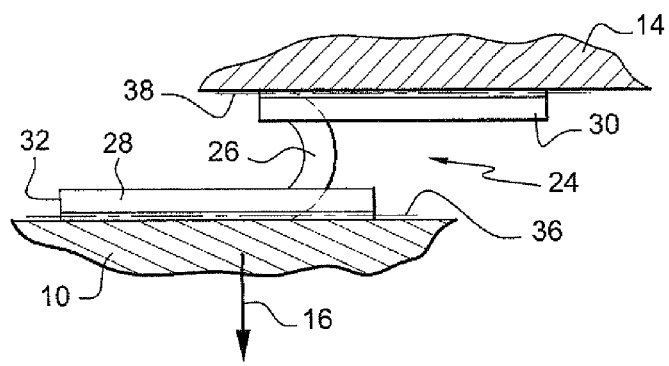
Figure 3C:
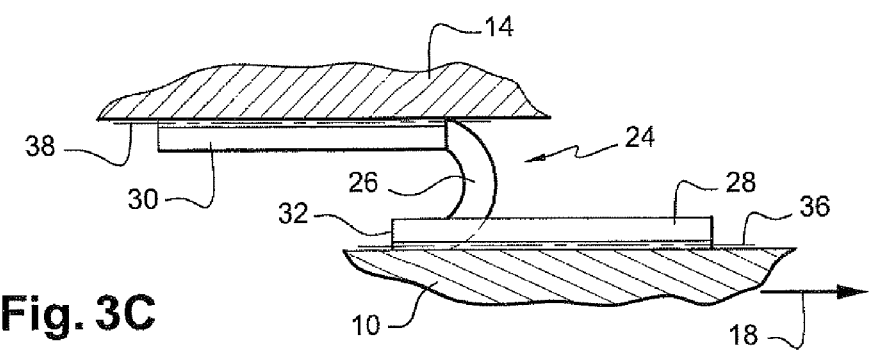
Figure 5A:
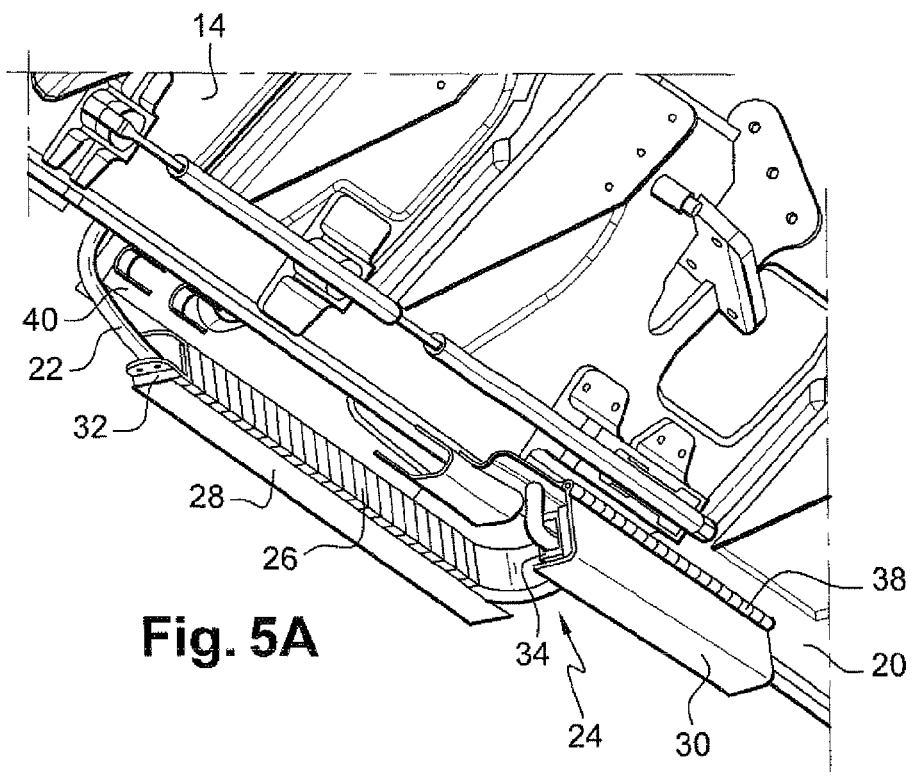
Figure 5B:
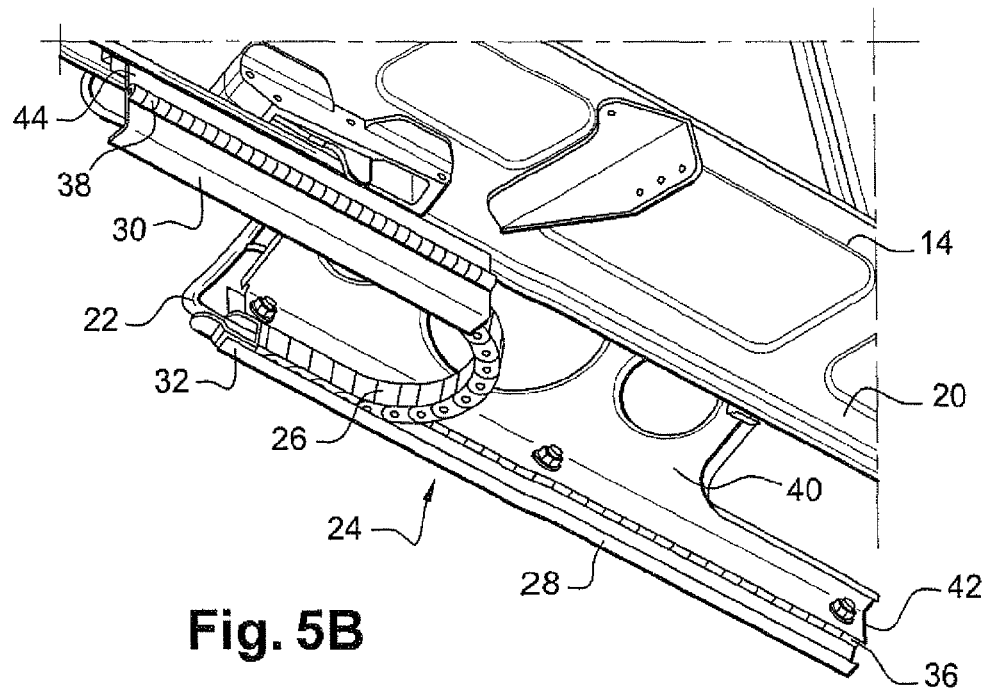

Other characteristics and advantages will emerge from the following description of the invention, a description that is given only by way of example, taking into account the accompanying drawings, in which:

FIG. 1A is a vertical diagrammatic cutaway of a direct-vision window in closed position, FIG. 1B is a vertical diagrammatic cutaway of a direct-vision window that is offset relative to its support, FIG. 2A is a lateral elevation view that illustrates a direct-vision window to the right of the opening, FIG. 2B is a lateral elevation view that illustrates a direct-vision window that releases an opening, FIGS. 3A to 3C are block diagrams illustrating the operation of the device according to the invention, FIG. 4A is a vertical cutaway illustrating the device of the invention according to an embodiment, the direct-vision window in closed position, FIG. 4B is a vertical cutaway that illustrates the device of FIG. 4A, the direct-vision window in offset position relative to its support, FIG. 5A is a bottom elevation view of the device of the invention according to an embodiment, the direct-vision window in closed position, and FIG. 5B is a bottom elevation view of the device of FIG. 5A, the direct-vision window in open position.

DETAILED DESCRIPTION OF THE INVENTION

In the various figures, a direct-vision window that can block an opening 12 that is delimited by a support 14 incorporated in the windshield of an aircraft flight deck was shown at 10.

According to an embodiment, the direct-vision window comprises a glassed-in frame that can incorporate a defrosting device and/or support a reading light, for example, or any other device.

This direct-vision window 10 moves relative to the support 14 so as to occupy a closed position, illustrated in FIG. 1A, in which it blocks the opening 12, and an open position, illustrated in FIG. 2B, in which it releases the opening 12. To pass from one position to the other, the direct-vision window 10 can move translationally according to a first translation, embodied by the arrow 16, toward the inside of the cabin, so as to occupy an intermediate position, illustrated in FIG. 1B, offset relative to the support 14, then according to a second so-called release translation, embodied by the arrow 18, so as to release the opening 12.

According to one embodiment, at the lower part, under the direct-vision window, the support comprises a table 20 that defines a slip plane on which the direct-vision window can slide during the position change between the closed position and the open position. This slip plane is generally slightly inclined by several tens of degrees, on the order of 20 to 40°.

In FIGS. 4A and 4B, the slip plane is illustrated on the horizontal line to simplify the representation, even if it can be inclined in reality.

The connection between the direct-vision window 10 and the support 14, the shapes, the sizes, and the materials of the different elements of the direct-vision window 10 and the support 14 are not explained in more detail because they are known to one skilled in the art.

The direct-vision window 10 and the support 14 are connected by at least one cable 22, in particular an electric cable for the power supply of equipment incorporated in the direct-vision window or supported by the latter.

For the rest of the description, cable is defined as a cable or a set of cables that are coupled to one another, whereby these cables may have different functions, for example power supply or signal transmission.

According to the invention, a protection and guide device 24 is provided for the cable 22 between the direct-vision window 10 and the support 14. This device 24 comprises a cable chain 26 that is connected, on the one hand, to a first support 28 that is articulated relative to the direct-vision window 10, and, on the other hand, a second support 30 that is articulated relative to the support 14.

The cable chain 26 comprises a number of links that are connected two by two by means of axes of rotation that are parallel to one another, so that said cable chain 26 can deform in a plane called a winding plane. Thus, the cable chain 26 is U-shaped with sides whose lengths can vary based on the relative position of the direct-vision window and the support, as illustrated in FIGS. 3A and 3C, and whose spacing can vary, in particular during the first translation of the direct-vision window, as illustrated in FIGS. 3A and 3B.

The links of the cable chain 26 have suitable shapes, with a U-shaped cross-section, for example, to be used as elements for guiding and protecting the cable 22.

According to one embodiment, the cable chain 26 can be made of plastic.

According to a characteristic of the invention, the cable chain 26 can deform so as to follow the movements of the direct-vision window while preserving a certain rigidity so as to protect the cable 22. In addition, the cable cannot be clamped because the cable chain is wound with a winding radius that cannot be less than a certain threshold.

A first end 32 of the cable chain 26 is connected to the first support 28 and a second end 34 of the cable chain 26 is connected to the second support 30. Thus, as illustrated in FIGS. 3A to 3C, the first side and the second side of the cable chain are able to be flattened respectively against the first support 28 and the second support 30. The first support 28 is articulated relative to the direct-vision window 10 so as to be able to pivot around an axis of articulation 36 that is essentially parallel to the release translation 18. According to one embodiment, this articulation can be carried out using an axis of rotation hinge, the axis 36.

The second support 30 is articulated relative to the support 14 so as to be able to pivot around an axis of articulation 38 that is essentially parallel to the release translation 18. According to an embodiment, this articulation can be obtained using an axis of rotation hinge, the axis 38.

According to one embodiment, the first and second supports 28, 30 have a square cross-section, whereby one side of the square is able to be used as a support to the cable chain 26, and whereby the other side is used as a protective element of the cable chain and is articulated at the level of its free edge, either relative to the direct-vision window or relative to the support 14.

The articulations 36 and 38 are necessary because of the change in the incline of the winding plane of the cable chain 26 during the first translation 16 of the direct-vision window, as illustrated in FIGS. 4A and 4B.

The cable chain 26 allows not only a first translational movement between the direct-vision window and the support that allows said window to release the opening but also another translational movement, essentially perpendicular to the first, that allows the direct-vision window to move away from its support, using a modification of the winding radius of said cable chain 26, as illustrated in FIGS. 3A and 3B.

According to another advantage of the invention, the cable 22 does not undergo clamping due to the presence of the cable chain, which makes it possible to limit the risks of malfunction.

In FIGS. 4A, 4B, 5A and 5B, a guide and protection device according to a preferred embodiment of the invention was shown.

At the level of its lower edge, the direct-vision window 10 comprises a crankcase 40 that is essentially parallel to the table 20 of the support. This crankcase 40 is extended so as to have its edge oriented toward the inside of the cabin that is offset toward the inside of the cabin relative to the edge of the table 20 that is oriented toward the inside of the cabin when the direct-vision window is in closed position. The crankcase 40 comprises a flange 42 that is oriented downward at the free end from which is provided the axis of articulation 36, whereby the first support 28 is able to pivot around said axis of articulation 36.

At the lower part, the table 20 comprises a foot 44 that is oriented downward, at the free end of which is provided the axis of articulation 38, whereby the second support 30 is able to pivot around said axis of articulation 38. The cable chain 26 is inserted between the first and second supports 28, 30.

According to this configuration, the cable chain 26 is protected by the crankcase 40 and is placed under the crankcase 40, which limits the risks of trouble for the flight crew.

As a variant, the device for protecting and guiding the cable could be placed at the upper edge of the direct-vision window.

When the direct-vision window is in closed position, as illustrated in FIGS. 4A and 5A, the cable chain 26 has a small winding radius, and the first support 28 is placed at a first end of the second stationary support 30. When it is desired to open the direct-vision window, it is necessary to carry out a first translation so as to move said window away from the support 14. As illustrated in FIG. 4B, when the direct-vision window is in the intermediate position, the cable chain 26 has a larger winding radius. When the direct-vision window 10 is in open position after the second translation, the first support 28 is placed at the other end of the second stationary support 30 relative to the closed position.

The invention claimed is:

1. A device for protecting and guiding at least one cable (22) that connects i) a direct-vision window (10) of an aircraft cabin that is provided for blocking an opening (12) and ii) a corresponding window support (14), said direct-vision window (10) being moveable according to a first translation (16), toward an inside of the cabin to an intermediate position that is offset relative to the window support (14), then according to a second release translation (18), so as to unblock the opening (12), the device comprising:

a cable chain (26) deformable along a winding plane, and protects, and guides said cable (22), on both sides of said cable chain (26), said cable chain being U-shaped with a first side and second side whose lengths vary based on the relative position of the direct-vision window and the window support;

a first support (28) that is articulable relative to the direct-vision window (10) so as to be pivotable around an axis of articulation (36) that is essentially parallel to the second release translation (18), and a second support (30) that is articulable relative to the window support (14) so as to be pivotable around an axis of articulation (38) that is essentially parallel to the second release translation (18), the first and second supports (28, 30) each having a square cross-section, wherein a first end of the cable chain is connected to the first support and a second end of the cable chain is connected to the second support, so as the first side and the second side of the U-shaped cable chain are able to be flattened respectively against one side of the square cross-section of the first support and one side of the square cross-section of the second support.

2. The protection and guide device according to claim 1, wherein the cable chain (26) comprises a number of links that are connected two by two by means of axes of rotation that are parallel to one another, so that said cable chain (26) can deform in the winding plane.

3. The protection and guide device according to claim 2, further comprising a crankcase (40), inserted in the lower part of the direct-vision window parallel to a table (20) that is connected to the support (14) of the direct-vision window, said crankcase (40) comprises a flange (42) that is oriented downward at a level of a free end defining the axis of articulation (36) of the first support (28), the table (20) comprises, at a lower part, a foot (44) that is oriented downward, at a level of a free end defining the axis of articulation of the second support (30).

4. The protection and guide device according to claim 1, further comprising a crankcase (40), inserted in a lower part of the direct-vision window parallel to a table (20) that is connected to the window support (14) of the direct-vision window, said crankcase (40) comprises a flange (42) that is oriented downward at a level of a free end defining the axis of articulation (36) of the first support (28), the table (20) comprises, at a lower part, a foot (44) that is oriented downward, at a level of a free end defining the axis of articulation (38) of the second support (30).

5. The protection and guide device according to claims 1, wherein the first support includes a hinge.

6. The protection and guide device according to claims 5, wherein the second support includes a hinge.

7. The protection and guide device according to claims 1, wherein the first support is stationary.

8. The protection and guide device according to claims 1, wherein the first support is stationary.

9. A device to protect and guide at least one cable connecting a direct-vision window of an aircraft cabin with a window support, said direct-vision window moves in a first translation direction, toward an inside of the cabin, to an intermediate position that is offset relative to the window support, and in a second release translation direction unblocking an opening, the device comprising:

a cable chain protecting and guiding said cable, the cable chain deforms along a winding plane when the direct-vision window moves;

a first articulable support for the direct-vision window pivoting on an articulation axis parallel to the second release direction, the first articulable support having a first edge to support the cable chain; and a second articulable support for the window support pivoting on an articulation axis parallel to the second release direction, the second articulable support having a first edge to support the cable chain, wherein when the direct-vision window moves in the second release translation direction a portion of the cable chain will flatten against the first edge of the first support or the first edge of the second support.

10. The protection and guide device according to claim 9, wherein the cable chain includes a number of links connected two by two by axes of rotation that are parallel to one another.

11. The protection and guide device according to claim 9, wherein the first support is connected to the window support.

12. The protection and guide device according to claim 9, wherein the second support is connected to the direct-vision window.

13. The protection and guide device according to claim 9, wherein the first support includes a hinge.

14. The protection and guide device according to claim 13, wherein the second support includes a hinge.

15. The protection and guide device according to claim 14, the window support includes a table, the table having a foot connect to the first support associated with the window support.

16. The protection and guide device according to claim 9, wherein the direct-vision window includes a crankcase to protect the cable chain.

17. The protection and guide device according to claim 16, wherein the crankcase includes a flange extending downward and connecting to the second support associated with the direct-vision window.

18. The protection and guide device according to claim 17, the window support includes a table, the table having a foot connect to the first support associated with the window support.

19. A protection and guide device, comprising:

at least one cable connecting a direct-vision window of an aircraft cabin with a corresponding window support, the direct-vision window moveable in a first translation direction, toward an inside of the cabin, and in a second release translation direction to unblocking an opening;

a cable chain protecting and guiding the at least one cable, the cable chain deforms along a winding plane when the direct-vision window moves;

a first articulable support for the direct-vision window pivoting on an articulation axis parallel to the second release direction, the first articulable support having a first edge to support the cable chain; and a second articulable support for the window support pivoting on an articulation axis parallel to the second release direction, the second articulable support having a first edge to support the cable chain, wherein when the direct-vision window moves in the second release translation direction a portion of the cable chain will flatten against the first edge of the first support or the first edge of the second support.

* * * * *